Aug. 20, 1968   J. S. OLES   3,397,927
STAR BEARING
Filed Oct. 24, 1965
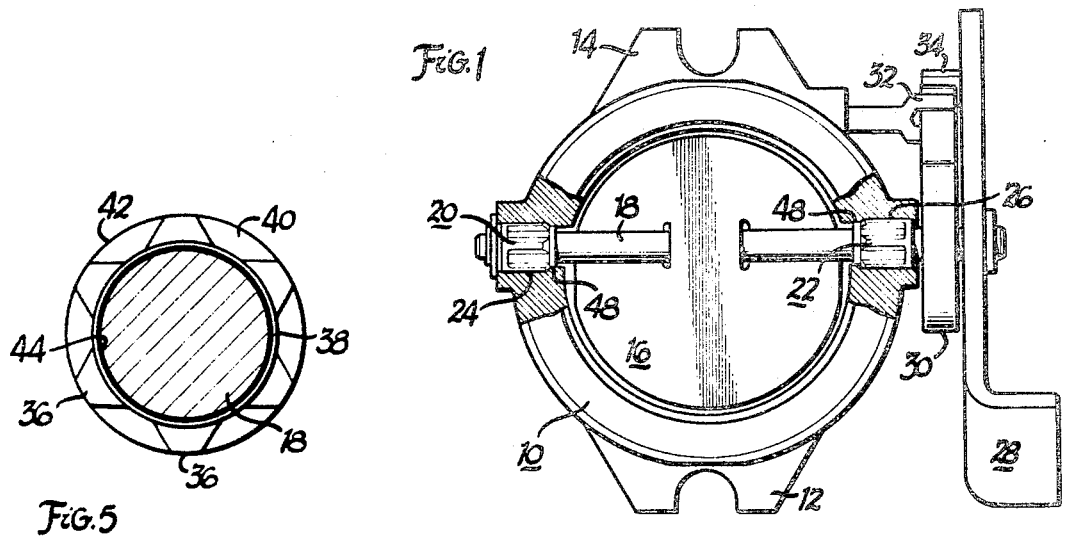
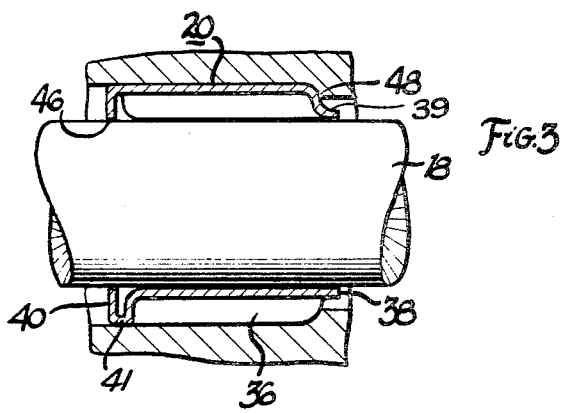
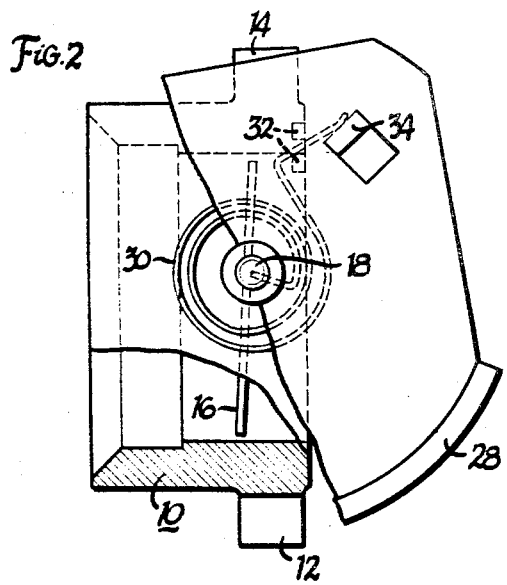
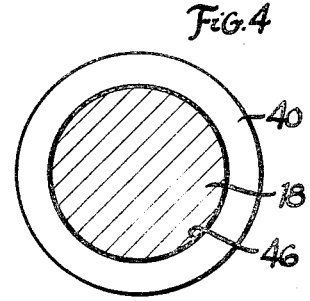
Inventor.
JOHN S. OLES
By
Wilson, Settle, Batchelder
Att'ys.   & Craig

United States Patent Office 3,397,927
Patented Aug. 20, 1968

3,397,927
STAR BEARING
John S. Oles, 15035 Prevost St.,
Detroit, Mich. 48227
Filed Oct. 24, 1965, Ser. No. 504,628
4 Claims. (Cl. 308—2)

ABSTRACT OF THE DISCLOSURE

The disclosure includes a star bearing for use on a shaft in an automobile exhaust heat regulator valve. The bearing includes a circumferentially uninterrupted cylinder having axially extended corrugations which are closed on one end by a reduced diameter horizontally extending band to provide a running fit with a shaft to restrict or eliminate the passage of impurities into the interior of the bearing and to come in contact with the shaft. The corrugations are closed on the other end of the bearing by an inwardly directed flange to provide a lubricant space in the interior of the bearing and to keep out foreign matter. The outer portions of the corrugations are spaced apart from one end to the other to provide open spaces therebetween and a space around said reduced diameter band while the inner surfaces of the corrugations serve as scrapers and bearings for the shaft.

---

This invention relates to bearings, and more particularly to a star bearing adapted for use on the shaft of an automobile exhaust heat regulator valve.

For best efficiencies, engines used in automobiles and for other uses should operate at relatively high temperatures considerably above normal atmospheric temperatures. In order to induce rapid warm up of engine carburetors it is common practice to by-pass the exhaust gases or a portion thereof around the base of the carburetor or around a hot spot in the intake manifold to assist in vaporizing the fuel. The by-pass valve controlling the flow of exhaust gases around the carburetor or intake manifold is controlled in part by a thermostatic element so that when the engine is operating below normal operating temperatures the valve is closed to induce a flow of exhaust gases around the carburetor or intake manifold, and as the engine warms up to operating temperatures the thermostatic element permits the valve to open thereby passing the exhaust gases directly to the exhaust pipe.

Difficulties have heretofore been experienced with the use of such by-pass valves because minute particles of carbon and other impurities present in the exhaust gases seep along the shaft and cause binding in the bearings of the shaft, thereby rendering the valve inoperative and reducing the overall efficiency of the engine.

In an effort to overcome these difficulties it has been common practice to provide a relatively wide clearance, .006" or more, between the shaft and the bearing in which the shaft is pivoted. This relatively wide tolerance has permitted the shaft to vibrate, thereby causing an undesirable rattle and other noise. To overcome this it has been common practice to provide a spring to bias the valve toward one side of the bearing. The result of this expediency has been that a somewhat longer period of time is required before the space between the shaft and its bearing becomes clogged with carbon and other impurities from the exhaust gases, but inevitably, the shaft would stick in the bearing and would render the valve inoperable unless precautions are taken to cleanse it and lubricate it periodically, such for example as at six month intervals.

An object of my invention is to provide an improved star bearing having a plurality of axially extending flutes or corrugated ridges whereby the surfaces of the shaft and the bearing are contacted at circumferentially spaced points which induce a wiping or scraping action to maintain the surfaces of the shaft and bearing in a clean operating condition.

A further object of my invention resides in the provision of an improved bearing structure for use in exhaust heat regulator valves which will not be susceptible to malfunction resulting from the deposits of carbon and other impurities from the exhaust gases.

Another object of my invention is to provide an improved bearing for an exhaust by-pass valve wherein a chamber is provided between circumferentially spaced ridges and valleys in a star bearing structure to provide a lubricant space substantially sealed around a shaft.

Another object resides in the provision of an improved star bearing having circumferentially spaced flutes or corrugated ridges which can be economically fabricated on a stamping press from strip material, and which provides a bearing having a plurality of circumferentially spaced wiping surfaces to prevent the accumulation of contaminants between a shaft and bearing members.

Still another object of my invention is to provide an improved bearing structure which is gas tight, thereby preventing the escape of gas under pressure along the shaft and between the shaft and bearing members.

Another object is to provide an improved bearing structure having a plurality of circumferentially spaced flutes or corrugations adapted to be projected into an aperture with a light press fit, and wherein the inner surfaces of the flutes or corrugations engage a shaft rotatably mounted therein with a running fit.

Yet another object of my invention resides in the provision of an improved fluid tight bearing having circumferentially spaced axially extending flutes terminating in spaced rounded end sections closing opposite ends of the bearing, thus providing a fluid tight seal and having a storage space within the bearing for the reception of a lubricant.

Other objects of this invention will appear in the following description and appended claims, reference being had to the accompanying drawings forming a part of this specification wherein like reference characters designate corresponding parts in the several views.

FIGURE 1 is an elevational view, partly in section, of an exhaust control valve assembly embodying my invention;

FIGURE 2 is an end view of the exhaust control valve assembly illustrated in FIGURE 1;

FIGURE 3 is an enlarged sectional view of the star bearing illustrated in FIGURE 1;

FIGURE 4 is an end elevational view of the star bearing structure illustrated in FIGURE 3; and FIGURE 5 is an end elevational view of the opposite end of the star bearing structure illustrated in FIGURE 3.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now more particularly to FIGURES 1 and 2 my invention is illustrated as applied to an exhaust control valve assembly having a body member 10 having radially extending ears 12 and 14 by which the body 10 may be clamped to the cooperating engine parts, such for example as between an exhaust manifold on one side and an exhaust pipe on the other side.

The valve assembly includes a valve plate 16 welded or otherwise secured to a shaft 18, the shaft being mounted in the body member 10 to mount the shaft offset from the center of the valve plate 16 so that the valve may be influenced by the flow of exhaust gases through the assembly.

The shaft 18 is mounted in the body member 10 at opposite ends in a pair of star bearings 20 and 22 journaled in bores 24 and 26 formed in the body 10. In the control of the valve 16 a counterweight 28 is secured to the shaft 18, and the position of the shaft is influenced by a temperature responsive element such as a bimetal spring 30, one end of which is secured to the shaft 18, and the other of which projects between abutments 32 and has a projection 34 secured thereto.

Referring now more particularly to FIGURES 3–5 the structure of the star bearings 20 and 22 is illustrated. It will be noted that a plurality of circumferentially spaced axially extending corrugations or flutes 36 extend from one end 38 to the other end 40 of the bearing 20. The end 38 provides a band 39 and the end 40 provides a band 41. The outer extremities of the corrugations or flutes 36 having circumferential surfaces conforming with the desired outer diameter of the bearing as illustrated at 42. It will also be noted that the inner surface of the bearing is defined by inner circumferential surfaces 44 of the corrugations or flutes 36, the inner diameter of the surfaces 44 being a running clearance with the shaft 18.

As illustrated in FIGURE 3, the corrugations or flutes 36 at one end 38 of the bearing 20 are contracted to provide band 39 and a running fit with the shaft 18, thereby cooperating to provide a minimum clearance with the shaft 18 to prevent exhaust gases from passing axially between the shaft and bearing. The opposite end 40 of the bearing 20 has a radially inwardly directed flange 46 aligned with the outer diameter of the corrugations 36. The inner surfaces of the convolutions 36 provide a running fit with the shaft 18 and cooperate with the end 38 of the bearing to prevent exhaust gases from flowing along the shaft 18.

It will be noted that the bores 20 and 22 illustrated in FIGURE 1 are provided with stepped surfaces 48, also illustrated in FIGURE 3, to engage the ends of the bearing structures 20 and 22 in the area of the contraction of the corrugations or flutes 36 to provide stops to position the bearings 20 and 22 in the bores 24 and 26, respectively. The outer diameter defined by the circumferential surfaces 42 of the corrugations or flutes 36 are proportioned to be a light press-fit in the inner diameter of the bores 24 and 26 to securely seal the star bearings 20 and 22 within the bores 24 and 26. My improved bearing can be proportioned to fit bores 24 and 26 of other than circular configuration.

It will be noted that by reason of the fact that the ends 38 and 40, at opposite ends of the corrugations or flutes 36 are a running fit with the shaft 18 a space within the corrugations or flutes 36 is provided for the reception of a suitable lubricant, preferably of the high temperature type, so that the assembly can be packed with lubricant and will not need servicing for extended periods of time.

It will be noted that I have provided a construction wherein the star bearings are seated in bores 24 and 26, and the shaft 18 is journaled within the ends 38 and 40 of the bearings with a relatively close running fit, and also along the circumferentially inner surfaces 44 of the flutes. Since these elements are well lubricated and are protected from the ingress of exhaust gases containing carbon and other contaminants, the construction will be long lifed and relatively service free.

My improved star bearing may economically be produced for example by a stamping process and may desirably be formed from strip stock.

It will, of course, be apparent that while my invention has been described with particular reference to an exhaust control valve assembly it has application generally in industry and can advantageously be used in many installations where service free operation is desired over extended periods of time.

While my invention has been described with particular reference to the single embodiment, it will be apparent that various changes can be made without departing from the spirit of my invention as defined by the following claims.

I claim:
1. A circumferentially uninterrupted star bearing having a plurality of circumferentially spaced axially extending corrugations defining inner and outer surfaces of said bearing, said corrugations terminating at one end adjacent a reduced diameter closed circular horizontally extending band aligned with the inner diameter of the corrugations and terminating at the other end in a closed circular band aligned with the outer diameter of the corrugations and an inwardly directed flange extending from the outer diameter of the corrugations at said other end to an inner diameter aligned substantially with the inner diameter of the corrugations.

2. The invention defined in claim 1 wherein said corrugations provide open spaces therebetween on the outer side thereof throughout the length of said corrugations.

3. The invention defined in claim 1 wherein a lubricant chamber is formed within the space inside of the corrugations and between the ends of the bearing.

4. A circumferentially uninterrupted star bearing in combination with a body member having a bore and a shaft wherein the improvement comprises a plurality of circumferentially spaced axially extending corrugations on the outer surfaces of the bearing terminating at one end adjacent a reduced diameter closed circular horizontally extending band aligned with the inner diameter of the corrugations and terminating at the other end in a closed circular band aligned with the outer diameter of the corrugations and an inwardly directed flange extending from the outer diameter of the corrugations at said other end to an inner diameter aligned substantially with the inner diameter of the corrugations to arrange the outer surfaces of the corrugations to engage said body member bore and the inner surfaces of said corrugations, reduced diameter band and flange to serve as a running fit with said shaft.

References Cited

UNITED STATES PATENTS

| | | | |
|---|---|---|---|
| 3,318,642 | 5/1967 | Peterson | 308—26 |
| 3,330,605 | 7/1967 | Jasmand | 308—36.1 X |
| 679,338 | 7/1901 | Rohrheck | 308—237 X |
| 1,156,582 | 10/1915 | Biggar | 308—237 X |
| 1,738,037 | 12/1929 | Collins | 308—237 |
| 2,356,027 | 8/1944 | Boyd | 308—238 X |
| 2,867,238 | 1/1959 | Wilfert | 251—305 |
| 2,897,026 | 7/1959 | Haller | 308—238 |
| 2,986,373 | 5/1961 | Masheded | 251—305 |
| 3,210,108 | 10/1965 | Herhenar. | |
| 3,268,280 | 8/1966 | Miller | 308—36.1 |
| 3,269,204 | 8/1966 | Schleicher | 308—236 X |
| 3,322,475 | 5/1967 | Schick | 308—238 X |

FOREIGN PATENTS

| | | |
|---|---|---|
| 903,762 | 2/1954 | Germany. |
| 517,514 | 3/1954 | Italy. |

MARTIN P. SCHWADRON, *Primary Examiner.*

L. L. JOHNSON, *Assistant Examiner.*